United States Patent [19]

Jones

[11] Patent Number: 4,540,925
[45] Date of Patent: Sep. 10, 1985

[54] CONTROL SYSTEM FOR ELECTRIC MOTOR

[75] Inventor: Donald H. Jones, Pittsburgh, Pa.

[73] Assignee: Contraves Goerz Corporation, Pittsburgh, Pa.

[21] Appl. No.: 632,315

[22] Filed: Jul. 19, 1984

Related U.S. Application Data

[63] Continuation of Ser. No. 530,252, Sep. 8, 1983, abandoned.

[51] Int. Cl.³ .............................................. G05B 19/28
[52] U.S. Cl. ..................................... 318/602; 318/615; 318/608; 318/717
[58] Field of Search ................................ 318/600-605, 318/615-618, 711, 713, 714-717, 719-721, 799, 809, 608

[56] References Cited

U.S. PATENT DOCUMENTS

| | | | |
|---|---|---|---|
| 3,737,747 | 6/1973 | Krauer | 318/721 |
| 4,030,132 | 6/1977 | Ifitikar et al. | 318/617 X |
| 4,125,796 | 11/1978 | Nagase et al. | 318/716 X |
| 4,258,301 | 3/1981 | Kawa | 318/603 X |
| 4,276,505 | 6/1981 | Bose | 318/717 X |
| 4,295,084 | 10/1981 | Nagase et al. | 318/719 |
| 4,315,200 | 2/1982 | Yamada et al. | 318/603 |
| 4,331,910 | 5/1982 | Kohzai et al. | 318/618 |
| 4,357,569 | 11/1982 | Iwakane et al. | 318/721 |

Primary Examiner—B. Dobeck
Attorney, Agent, or Firm—Buell, Ziesenheim, Beck & Alstadt

[57] ABSTRACT

The motor control system for an electric motor having no mechanical means integral therewith for commutating current provides the ability to control position, velocity and torque of such a motor to the degree achievable with DC motors having mechanical commutators. Such a result is achieved by maintaining a desired spatial relationship between the resultant magnetic field created by the stationary member and the movable member of the electric motor. The control system includes detecting apparatus for detecting parameters of the motor that dictate, in part, the desired spatial relationship within the motor and command apparatus for creating a motor command signal which, when generated in the motor, causes the desired spatial relationship to be established. The present invention also permits maintenance of an optimal spatial relation—a spatial relationship that causes the motor to produce desired torque with a minimum excitation.

4 Claims, 8 Drawing Figures

CONTROL SYSTEM FOR ELECTRIC MOTOR

This application is a continuation of application Ser. No. 530,252, filed 9/8/83, now abandoned.

BACKGROUND OF THE INVENTION

1. Field of the Invention

This invention relates to a control system for an electric motor and, more particularly, to a control system for maintaining a desired spatial relationship between the movable member of the motor and the resultant magnetic field created by the stationary member of the motor.

2. Description of the Prior Art

Methods for achieving precise control of motor torque, speed or position are well known in the art of servo control systems. The use of AC motors and servo control systems therefor is also well known and is generally employed in instrument servo applications. Induction motors are often used in such applications and the control system therefor is designed to yield good servo performance. An example of such a servo control system is a multiphase AC carrier amplifier. The major disadvantage associated with the use of such AC motor servo controls is their high inefficiency due to the characteristics of the AC motor. Accordingly, such AC motor servo control systems are impractical at power levels above 100 to 200 watts of output power. If the AC induction motor is designed for high efficiency, the motor becomes nonlinear and cannot be controlled precisely and economically by servo control techniques.

Therefore, DC motors are usually chosen for applications where precise control of torque, speed or position is essential and power outputs above 100 to 200 watts are required. The manner of use of DC motors in such applications is a very well known and highly developed art. The use of DC motors in such applications with the appropriate controls and feedback transducers provides performance that is superior to that of AC motors and their corresponding controls in servo control applications and, therefore, DC motors are commonly used in such applications rather than AC motors.

The major disadvantages associated with the use of DC motors and control systems therefor result from the existence of brushes and commutators within the motor that mechanically control the orientation of the magnetic field within the motor. Such brushes and commutators are subject to wear and require periodic maintenance and replacement, which is costly to perform and requires a motor construction that makes the brushes and commutators accessible to maintenance personnel. Moreover, the movable members of most DC motors have conductors wound therearound through which electric current is passed to generate the magnetic field required to produce torque or force. The current passing through the windings generates heat within the movable member which is difficult to remove and limits the performance of the motor.

A servo motor control system for an AC synchronous reluctance motor is described in U.S. Pat. No. 3,737,747 issued to Krauer on June 5, 1973. That control system includes a three-phase power amplifier that is connected to the three-phase stator windings of a synchronous reluctance motor and drives the motor. Due to the nonlinearities and magnetic saturation of the motor and the limitations of the power amplifier, the system is limited in performance and does not achieve operating characteristics which are comparable to those achieved by DC motors and the control systems therefor.

Accordingly, there exists a need for a control system for a motor having no mechanical means integral therewith for commutating motor current which achieves performance that is equivalent to that achieved with control systems for motors having such means.

SUMMARY OF THE INVENTION

The present invention provides a control system for regulating precisely the torque, speed or position of the movable member of an electric motor. Although the present invention is particularly useful for controlling AC synchronous motors, it can be used to control other types of motors having no mechanical means integral therewith for commutating motor current.

In particular, the present invention maintains a desired spatial relationship between the movable member of the motor and the resultant field created by the stationary member thereof when the motor is energized. The control system maintains such a spatial relationship by providing a motor command which, when generated in the motor, causes the magnetic field created by the stationary member to assume a predetermined position, at any instant of time, within the motor relative to the movable member. The nature of the desired spatial relationship can vary according to the desires of the user. One possible relationship useful when controlling a synchronous motor is a fixed spatial separation of the movable member and the resultant stationary member field at an instant of time.

It is well known that a synchronous motor will produce a maximum amount of torque at a particular level of motor excitation when the movable member and the resultant field created by the stationary member are separated by a particular distance relative to each other. Stated another way, there exists a relative position of the resultant stationary member field to the moveable member at which a synchronous motor will produce a desired amount of torque with a minimum amount of motor excitation. At low movable member speeds, such an optimal separation is 45 degrees for a rotating synchronous reluctance motor and 90 degrees for a rotating permanent magnet motor. Accordingly, the present invention can be used to optimize the efficiency of a synchronous motor by maintaining the optimal spatial separation of the movable member and resultant stationary member field. Such optimal spatial relationships can be determined empirically for a particular motor.

Preferably, the desired spatial relationship is maintained by the present invention by creating a periodic motor command and generating that command within the motor. The motor command is a multiphase command having components separated by the appropriate angular distance. Of course, when controlling a three-phase motor, the present invention would create a motor command having three components separated from each other by 120 degrees.

In particular, the present invention includes command apparatus for receiving an orientation command signal related to the desired spatial relationship between the position of the movable member of the motor and the resultant magnetic field established by the stationary member of the motor, and for creating a motor command signal for maintaining the desired spatial relationship within the motor. The present invention also includes apparatus for generating the motor command signal within the motor. Preferably, the command apparatus receives a signal relating to at least one operating parameter of the motor from a parameter detector and generates the orientation command signal therefrom, rather than receiving the orientation command signal from an external source.

The command apparatus can create an orientation command signal which is related to the position of the movable member and the optimal spatial relationship between the resultant stationary member field and the movable member within the motor. Since that optimal spatial relationship varies as the values of a number of parameters of the motor vary, such as the velocity at which the movable member moves and the torque produced by the motor, the present invention can include detecting apparatus for detecting at least one of those parameters, determining the optimal spatial relationship therefrom and creating an orientation command signal related thereto. Preferably, the command apparatus produces a motor command signal that is a periodic function of the orientation command signal.

Preferably, the system is supplied with a signal related to the torque to be produced by the motor and the orientation command signal is combined with the torque error signal—a signal related to the difference between the desired torque and the torque actually produced by the motor. Thus, the present invention can control precisely the amount of torque produced by the motor as well as the spatial relationship between the movable member and the resultant stationary member field within the motor. Of course, the control system can be used in an overall servo system for controlling the position and velocity of and torque generated by the movable member of the motor.

Although the present invention is particularly useful for controlling rotating electric motors, it can control the operation of linear motors as well.

Accordingly, the present invention is useful for maintaining a desired spatial relationship between the resultant magnetic field created by the stationary member of a motor and the movable member thereof within the motor. The present invention is also useful for controlling the amount of torque produced by a motor. The present invention is particularly useful for producing a desired amount of torque with a motor using a minimum level of motor excitation. The present invention is also particularly useful for controlling precisely the position and velocity of and the torque produced by the movable member of a motor.

When used herein, the term "resultant stationary member field" shall mean the resultant magnetic field created within the motor by the stationary member of the motor; the term "spatial relationship" shall mean the position of the resultant stationary member field relative to that of the movable member and the manner in which the positions vary with time; the term "optimal spatial relationship" shall mean the spatial relationship between the movable member and the resultant stationary member field that permits the motor to produce torque with a minimum motor excitation; the term "torque" shall include the term "force"; the term "position" shall include angular position and nonangular position; the term "movement" shall include rotational movement and nonrotational movement.

BRIEF DESCRIPTION OF THE DRAWINGS

The following detailed description of the preferred embodiments can be understood better if reference is made to the accompanying drawings, in which.

DETAILED DESCRIPTION OF THE PREFERRED EMBODIMENTS

Figure 1:
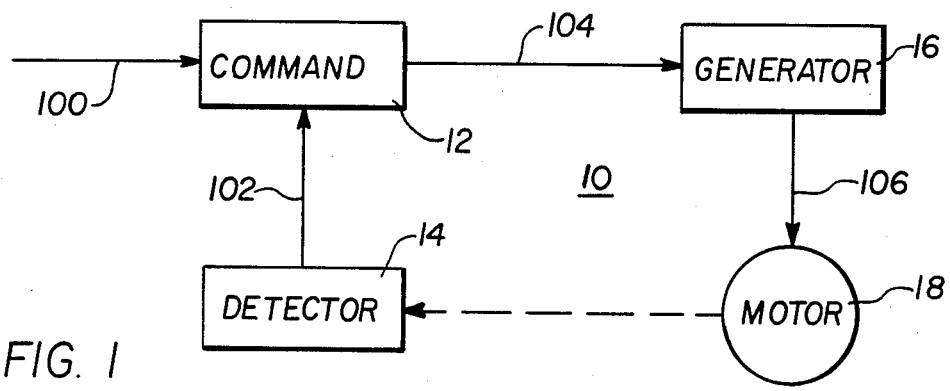
FIG. 1 is a block diagram illustrating graphically the present invention and a portion of the motor with which it can be used.

The preferred embodiment of the present invention is shown generally in schematic form in FIG. 1 and, for convenience, will be described as adapted for controlling of a three-phase rotating electric synchronous motor and establishing the optimal spatial relationship between the movable member and the resultant stationary member field. Appropriate modifications can be made to the preferred embodiment to provide any desired spatial relationship. Accordingly, for purposes of describing control of a synchronous motor, the optimal spatial relationship will be the optimal spatial separation of the movable member and the resultant stationary member field. Also, the preferred embodiment controls the motor by varying the electrical current flowing in the windings of the stationary member thereof.

Control system 10 includes command apparatus 12, detecting apparatus 14, and motor command generator 16. External command information, such as desired torque or desired—or, for purposes of this discussion, optimal—spatial separation, can be provided to system 10 on line 100. As discussed below, the orientation command signal—the signal related to the desired or optimal spatial separation—is created by the preferred embodiment by command apparatus 12 from parameter signals 102. In the preferred embodiment, the orientation command signal is related to the sum of the angular position of the movable member and the optimal spatial separation. Detecting apparatus 14 detects and supplies to command apparatus 12 parameters of motor 18 that enable command apparatus 12 to control operation of motor 18. Detecting apparatus 14 creates signals related to such parameters and supplies those signals to command apparatus 12 on line 102. Command apparatus 12 receives the signals on lines 100 and 102 and generates therefrom a motor command on line 104. Motor command generator 16 receives the motor command on line 104 and generates the motor command in the stationary member windings of motor 18 by creating the appropriate signals on line 106. When the motor command on line 104 is generated within motor 18, motor 18 produces the desired torque and optimal spatial separation.

Figure 2:
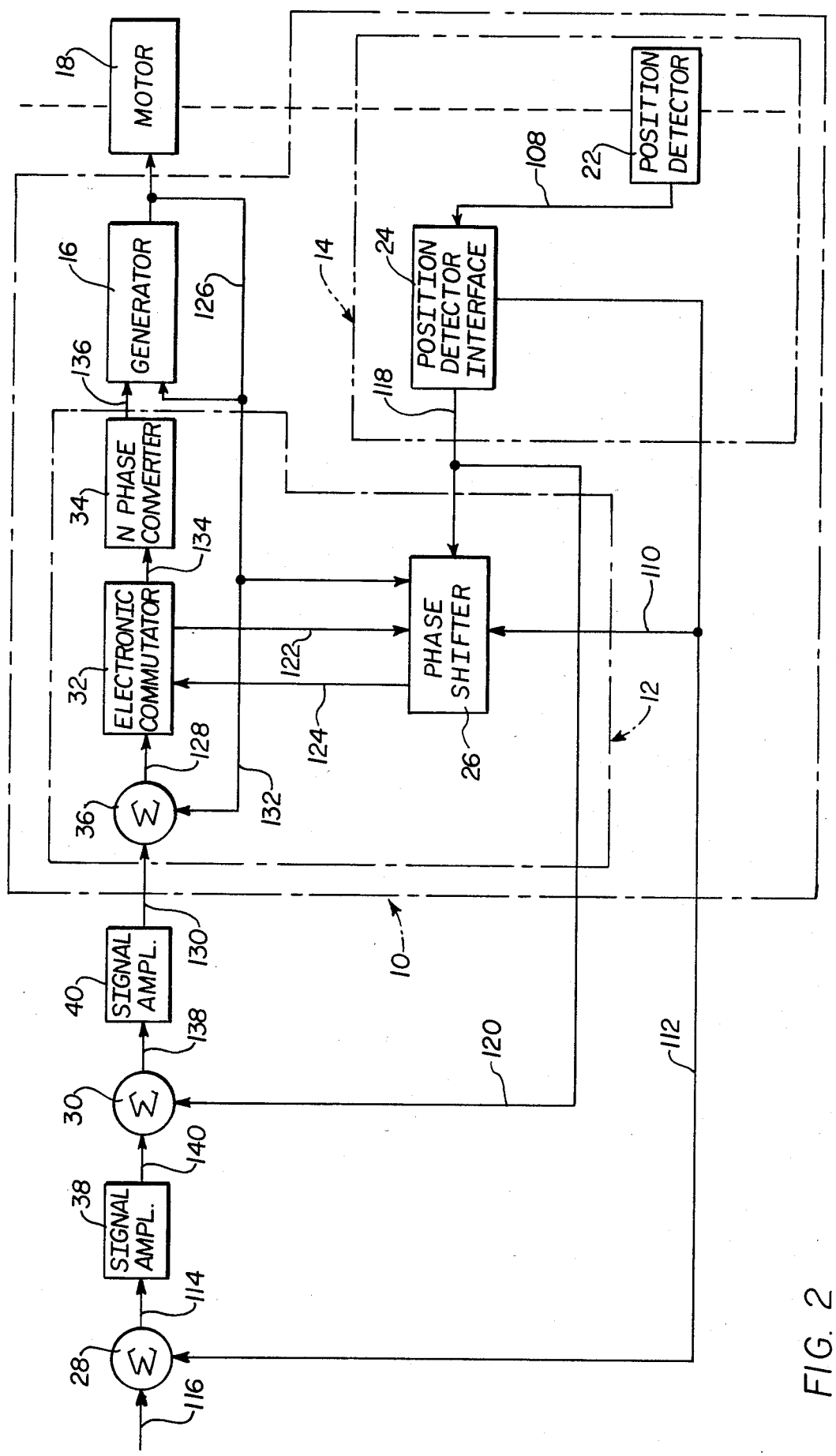
FIG. 2 illustrates graphically the present invention as it can be used in a control system for controlling position, velocity or torque.

FIG. 2 is a more detailed illustration of system 10 as it would be used in a servo control system for controlling motor position, velocity or torque. Detecting apparatus 14 includes position detector 22. Position detector 22 provides a signal related to the position of the movable member of motor 18 relative to motor 18 and provides that signal to position detector interface 24 and phase shifter 26 along lines 108 and 110 respectively. Position detector interface 24 includes a velocity detector that creates a velocity signal on line 118 from the position signal on line 108. Alternately, system 10 could include apparatus that would detect the velocity of the movable member of motor 18 without the aid of position detector 22. Position detector 22 can also provide a position signal on line 112 to summing junction 28 to permit summing junction 28 to produce a position error signal on line 114 which is the difference between the position command on line 116 and the actual position signal on line 112.

Position detector interface 24 calculates the actual velocity of the movable member of motor 18 from the position signal on line 108 and provides the resulting velocity signal to phase shifter 26 on line 118 and to velocity summing junction 30 on line 120. Velocity summing junction 30 creates a velocity error signal on line 138 which is the difference between the desired velocity signal on line 140 and the actual velocity signal on line 120. Signal amplifier 38 amplifies the position error signal on line 114 to achieve the desired velocity signal on line 140.

Command apparatus 12 includes phase shifter 26, electronic commutator 32, and phase converter 34. Phase shifter 26 determines from the signals on lines 110 and 118 along with the required torque direction signal on line 122, the optimal spatial relationship—the separation of the movable member from the stationary member field that must exist within motor 18 to ensure that the desired torque will be produced with a minimum motor excitation current. Phase shifter 26 provides an orientation command signal related to the optimal spatial relationship to electronic commutator 32 on line 124. Preferably, phase shifter 26 also receives a torque signal from line 126 that relates to the amount of torque being produced by motor 18. Accordingly, phase shifter 26 can use the torque signal on line 126 along with the signals on lines 118, 122 and 110 to produce an orientation command signal on line 124 that is related to the position and speed of the movable member and the torque produced thereby.

Electronic commutator 32 receives the orientation command signal on line 124 and creates a motor command signal on line 134 that is related to a periodic function of the orientation command signal. Preferably, electronic commutator 32 also receives a torque error signal on line 128 that is generated from the difference between the torque command signal on line 130 and the torque signal provided to summing junction 36 on line 132 and uses the torque error signal level as the maximum value for the motor command signal. Summing junction 36 creates a torque error signal on line 128 from the signals on lines 130 and 132. Signal amplifier 40 amplifies the velocity error signal on line 138 to achieve the torque command signal on line 130.

Preferably, electronic commutator 32 creates on line 134 a pair of generally sinusoidal motor command signals separated from each other by 90 degrees. Phase converter 34 receives the motor command signal on line 134 and converts that signal to a motor command signal having a number of components equal to the number of phases of motor 18. When the system is used to control a three-phase motor, converter 34 is a two-phase to three-phase converter and converts the two-phase motor command signal on line 134 to a three-phase motor command on line 136.

Generator 16 generates the signal on line 136 in the stationary member windings of motor 18.

It should be noted that summing junctions 30 and 36 can receive speed and torque commands, respectively, originating from a source other than summing junction 28 and line 116. However, in FIG. 2 it can be seen that system 10 can be used with an overall control system having a summing junction 28 for receiving a position command signal on line 116 and generating a position error signal therefrom on line 114. Signal amplifiers 38 and 40 amplify the position error signal on line 114 and the velocity error signal on line 138, respectively, to achieve a velocity command signal on line 140 and a torque command signal on line 130, respectively.

Figure 3:
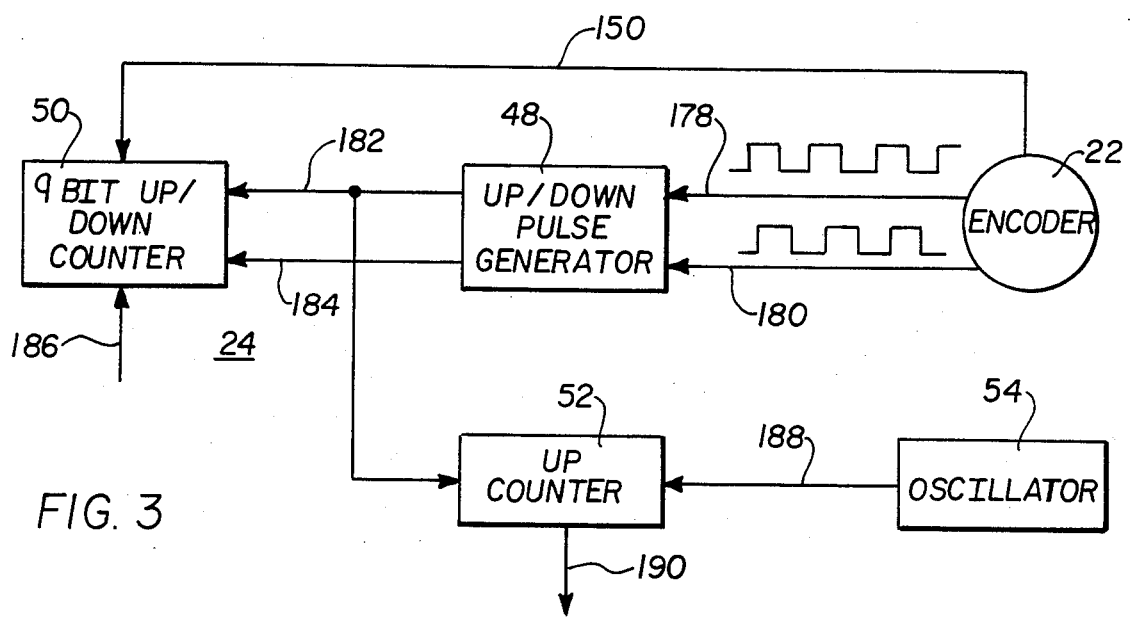
FIG. 3 is a view illustrating graphically a position detector and position detector interface suitable for use with the present invention.

FIG. 3 illustrates a suitable position detector interface 24. Position detector 22 in FIG. 3 is a digital encoder that is mechanically coupled to the movable member of motor 18. Encoder 22 provides information related to the position of the movable member in the form of signals on lines 178 and 180 which change state as the movable member of motor 18 rotates. The signals on lines 178 and 180 change levels a number of times during each revolution of the movable member of motor 18. The number of times that the signals on lines 178 or 180 of encoder 22 change state can be chosen to provide the desired resolution. The signals on lines 178 and 180 are identical to each other with the exception that they are displaced from each other by one-fourth of an electrical cycle.

Pulse generator 48 receives the signals on lines 178 and 180 and provides on lines 182 and 184 pulses representing movement of the movable member of motor 18 and the direction in which the movable member is moving, respectively. Counter 50 accumulates the pulses on line 182 and provides on line 186 a signal representative of that count and, accordingly, the position of the movable member. Counter 50 adds or subtracts pulses to or from the count depending on the value of the direction signal on line 184. Encoder 22 provides to counter 50 a reset signal on line 150 each time encoder 22 passes the reference position to ensure that counter 50 always has a count that is representative of the position of the movable member. Up counter 52 receives the position pulses on line 182 and a gating signal on line 188 from oscillator 54. Counter 52 counts the position pulses on line 182 for a period equal to one cycle of the signal on line 188. At the end of each cycle, counter 52 resets the count and begins counting for a new cycle. Accordingly, counter 52 produces a signal on line 190 representative of the velocity at which the movable member of motor 18 travels. The signals on lines 186 and 190 are in digital form.

Figure 4:
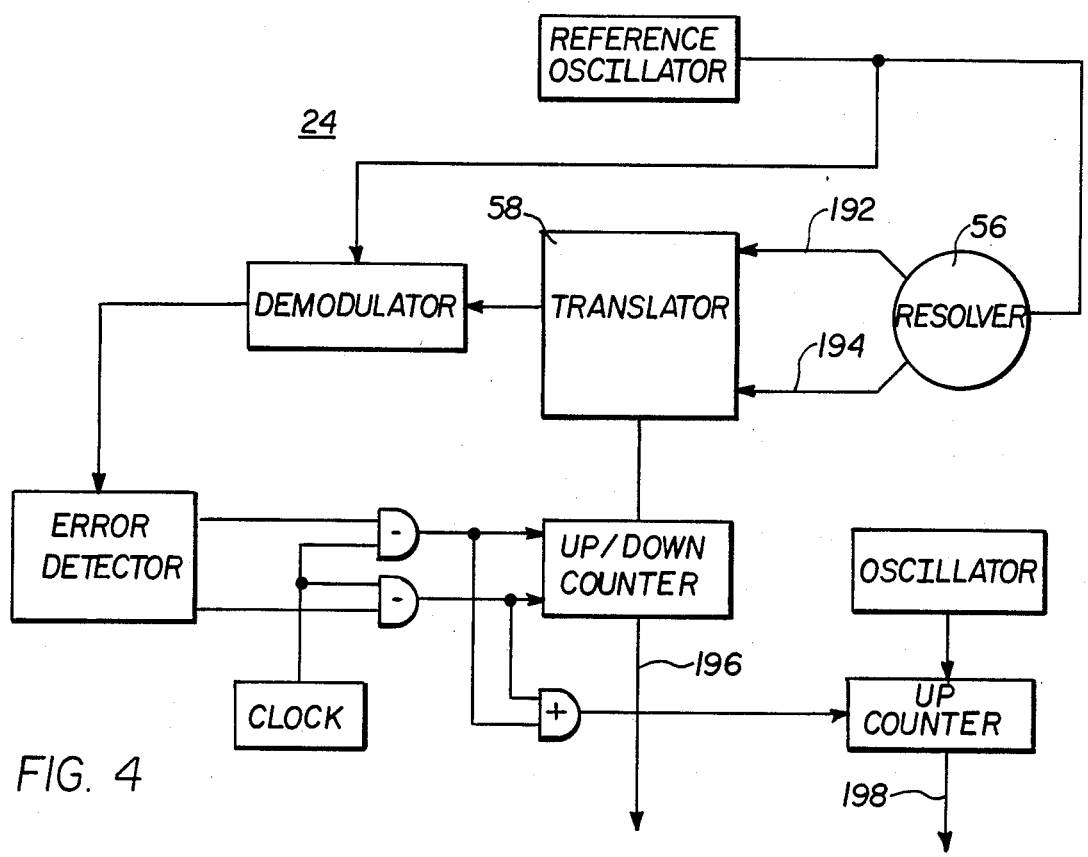
FIG. 4 is a view illustrating graphically an alternate position detector and position detector interface suitable for use with the present invention.

FIG. 4 shows an alternate position detector interface circuit 24 that can be used in the present invention. Interface circuit 24 of FIG. 4 includes an analog resolver 56 mechanically fixed to the movable member of motor 18. Resolver 56 produces two sinusoidal analog signals along lines 192 and 194 separated from each other by 90 degrees. Translator 58 receives the signals on lines 192 and 194. Translator 58 is described in detail in U.S. Pat. No. 3,984,672. The remainder of circuit 24 is a tracking digital angle encoder circuit, which is described fully in U.S. Pat. No. 3,984,831. U.S. Pat. Nos. 3,984,672 and 3,984,831 are hereby incorporated herein by reference. The tracking digital angle encoder circuit provides digital position and velocity signals on lines 196 and 198. The configuration and use of translator 58 and the tracking digital angle encoder circuit are fully described in the above-identified patents and will not be described further herein. One advantage associated with the use of interface circuit 24 shown in FIG. 4 is that it does not require use of a reset signal as is necessary with use of the optical encoder 22 described above.

Figure 5:
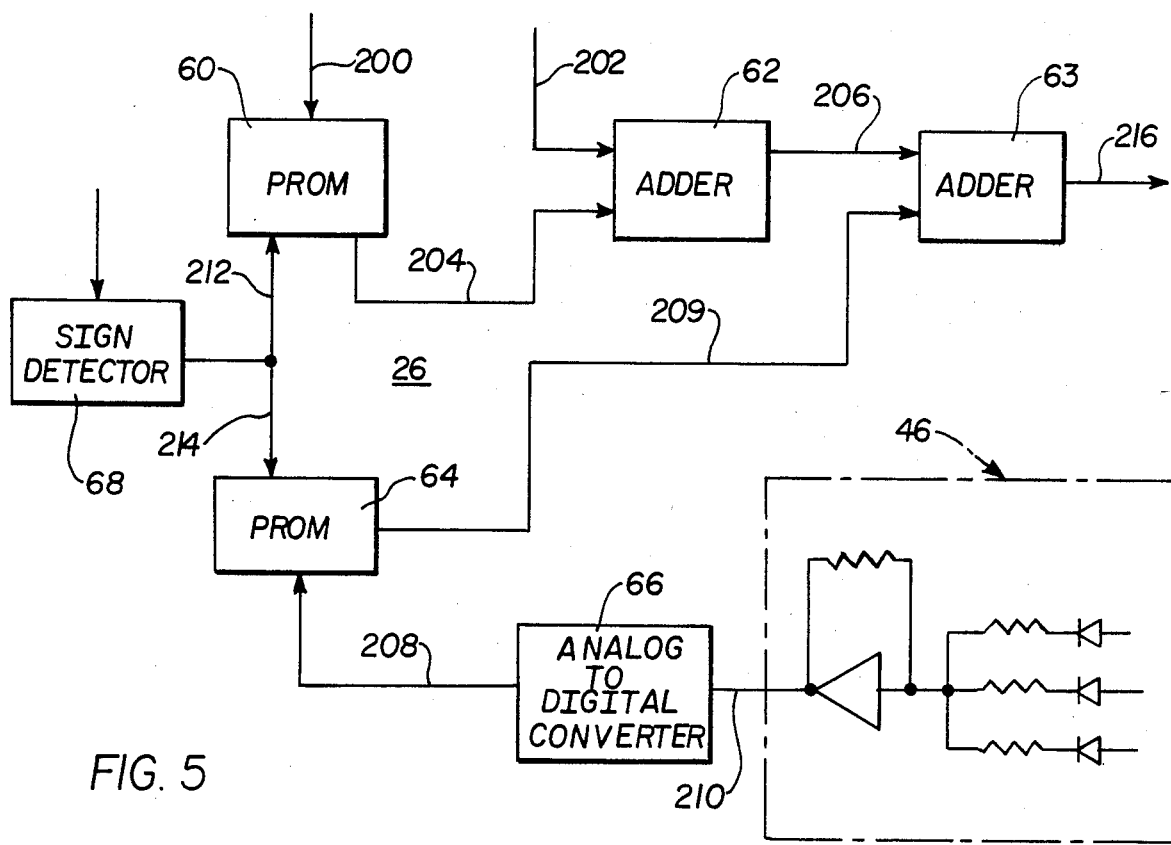
FIG. 5 is a view illustrating graphically a phase shifter and RMS current converter suitable for use with the present invention.

FIG. 5 illustrates graphically a phase shifter 26 suitable for use in the present invention. Phase shifter 26 receives digital movable member speed and position signals on lines 200 and 202. Programmable read only memory unit 60 (PROM) receives the digital speed signal on line 200. PROM 60 has stored therein the separation between the movable member and the resultant stationary member field, due to movable member speed, necessary to produce torque with a minimum current at all speeds within a range achievable by the movable member of motor 18. The digital speed signal on line 200 is used as an address to locate the value of the separation and that value is provided on line 204 to adder 62. Adder 62 also receives a digital position signal on line 202 and adds together the signals on lines 202 and 204 to establish, in part, the position of the resultant stationary member field necessary to produce torque at a minimum current. The orientation command signal related to such a position is provided on line 206. PROM 64 receives a signal on line 208 representing in digital form the torque produced by motor 18. RMS current converter 46 receives current flowing in the stationary member of motor 18 and converts that three-phase current to a single-phase current representing the RMS value of the three-phase current. The single-phase RMS current is provided to analog to digital (A/D) converter 66 along line 210. A/D converter 66 converts the RMS current signal on line 210 to a torque signal on line 208. As does PROM 60, PROM 64 uses the value of the signal on line 208 as an address to locate in PROM 64 the separation, due to motor torque, required to enable the motor 18 to produce desired torque with a minimum current. Sign detector 68 provides the most significant bit to signals 200 and 208 to enable PROMS 60 and 64 to provide a different set of separation values when the movable member of motor 18 rotates in the opposite direction. The sign signal is provided to PROMS 60 and 64 along lines 212 and 214 respectively. RMS converter can be of any suitable configuration known in the art and can have the configuration shown in FIG. 5. The signal on line 209 represents the optimal separation due to the value of the torque produced by the motor. Adder 63 adds together the orientation command signals on lines 206 and 209 and provides, on line 216, an orientation command signal related to the position of the resultant stationary member field that must exist, due to actual movable member speed and the torque produced thereby, to maintain the optimal separation within motor 18.

Figure 7:
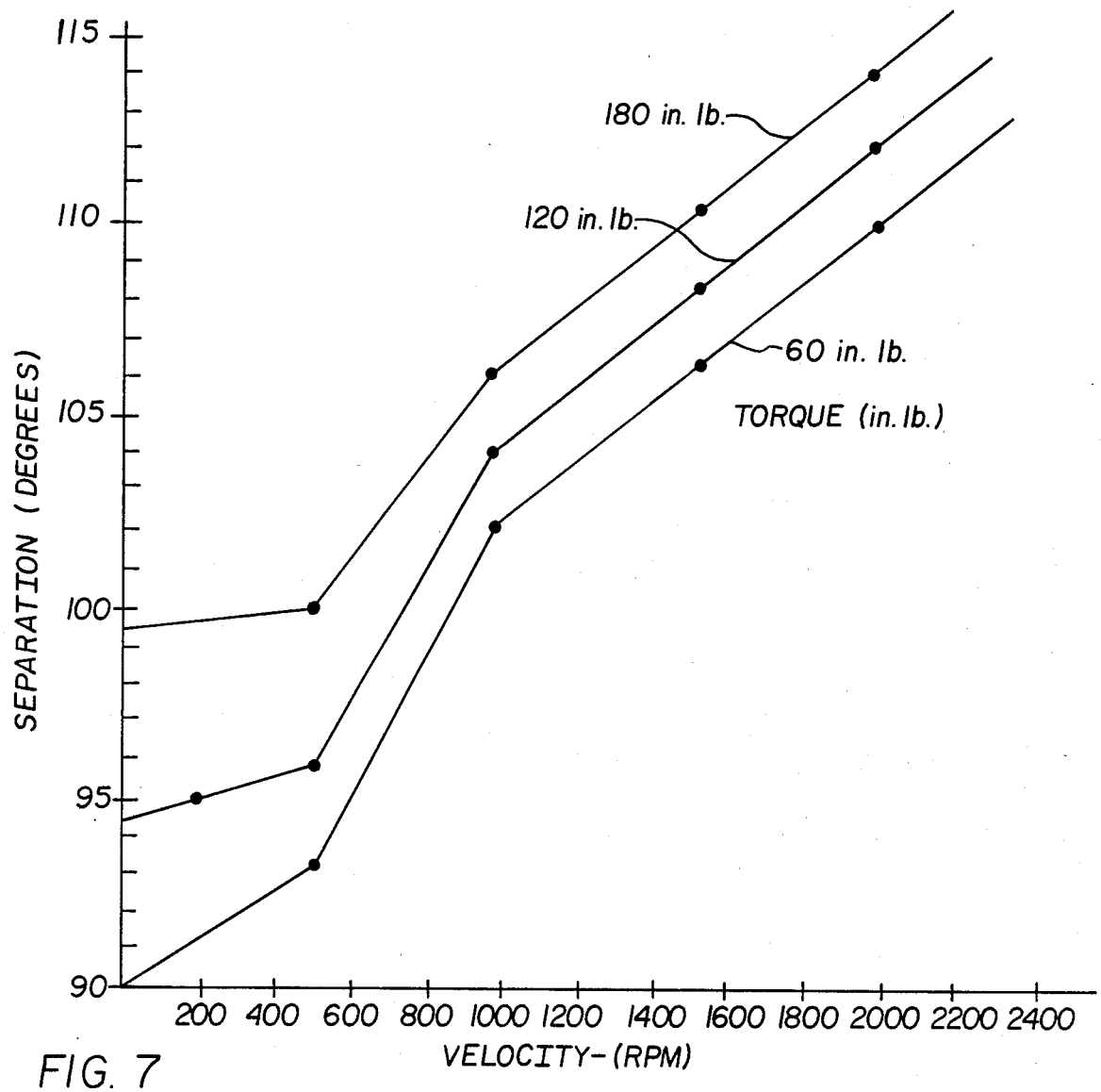
FIG. 7 is a view illustrating graphically the relationship among movable member velocity, movable member torque and separation for a particular motor.

The values of the separation that should be stored within PROMS 60 and 64 depend on the design of the motor to be controlled. The optimal separation values for a particular motor can be determined empirically by varying the separation throughout the range of velocity and torque obtainable with the motor and noting, for each value of velocity and torque, the separation at which maximum torque is realized. FIG. 7 shows the relationship among optimal separation, velocity and torque for one motor. Of course, any desired spatial separation or relationship can be maintained by detecting the desired motor parameters and storing appropriate values in a number of PROMS corresponding to the number of motor parameters detected.

Figure 6:
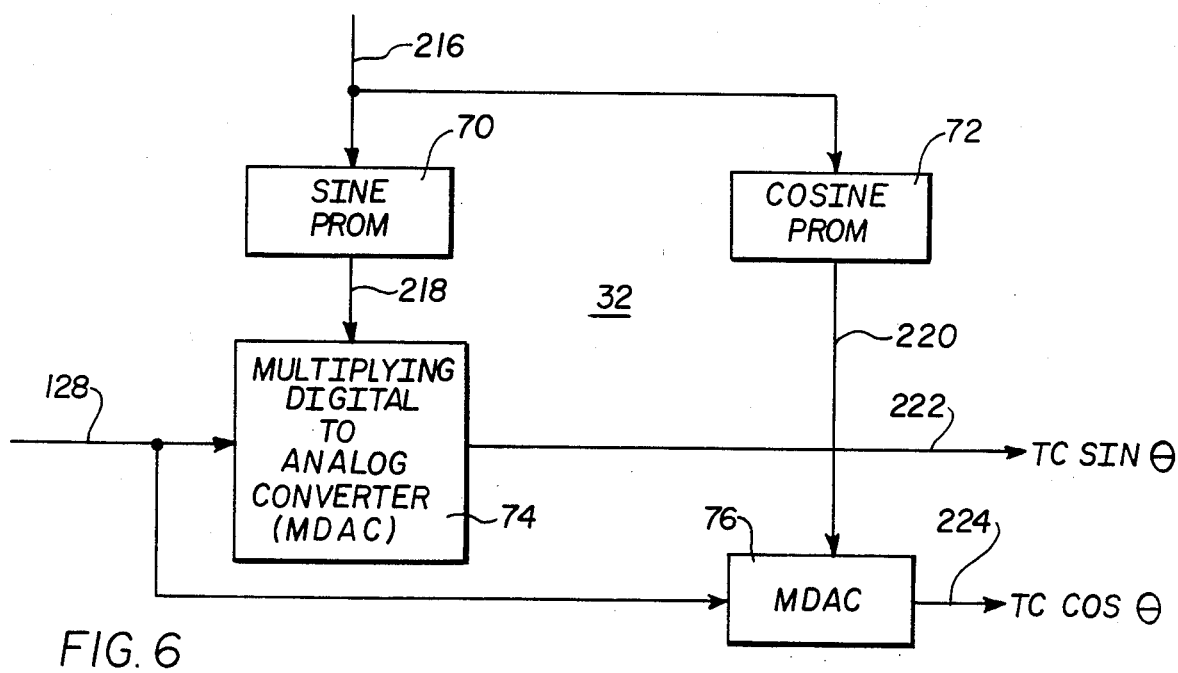
FIG. 6 is a view illustrating graphically an electronic commutator suitable for use with the present invention.

FIG. 6 shows a commutator circuit 32 suitable for use in the present invention. Commutator circuit 32 includes sine and cosine PROMS 70 and 72, respectively. Sine and cosine PROMS 70 and 72 receive the orientation command signal on line 216 from phase shifter 26. Sine and cosine PROMS 70 and 72 use the signal on line 216 as the addresses therein at which the sine and cosine, respectively, of the signal on line 216 can be found. Accordingly, the signals on lines 218 and 220 represent the sine and cosine, respectively, of the orientation command signal on line 216. Multiplying digital to analog converters 74 and 76 receive the signals on lines 218 and 220, respectively, along with the torque command on line 128 from summing junction 36 (FIG. 2) and provide outputs on lines 222 and 224 that are the sine and cosine of the signal on line 216 and have a maximum magnitude equal to the value of the torque error signal on line 128.

Figure 8:
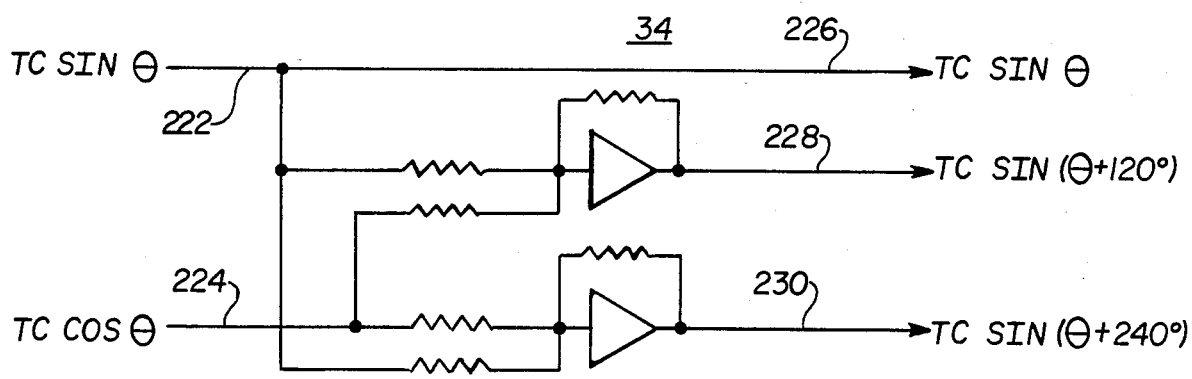
FIG. 8 is a circuit diagram of a two to three-phase converter suitable for use with the present invention.

FIG. 8 illustrates graphically a two to three-phase converter 34 that is suitable for use with the present invention. Two to three-phase converter 34 receives the motor command signals on lines 222 and 224 and converts those signals to a motor command signal having components of the following form:

(1) TC sin θ
(2) TC sin (θ+120°)
(3) TC sin (θ+240°)

where TC is the value of the desired torque signal and θ is the orientation command signal. Two to three-phase converter 34 can be any such suitable converter and can have a configuration as shown in FIG. 8.

Finally, generator 16, which can be any suitable amplifier, generates the motor command in the windings of the stationary member of motor 18. Generator 16 can include a motor current feedback loop to ensure that the motor command is generated accurately in motor 18.

What is claimed is:

1. A control system for current supplied to an electric motor having a stationary member, a movable member and no mechanical commutator, so as to produce a desired torque at minimum motor excitation current, comprising:
   a. detector means coupled to the movable member for determining a position and velocity of that member relative to the stationary member and furnishing signals related thereto respectively;
   b. command means connected to receive the signals from the detector means, and providing a motor command signal therefrom, the command means including:
      (i) phase shift means which receive the position and velocity signals and a torque direction signal and determine a spatial relationship between the movable member and a resultant stationary member field that permits the motor to produce the desired torque with a minimum motor excitation current, and provides an orientation command signal; and (ii) commutator means coupled to the phase shift means and receiving the orientation command signal and a torque error signal, and producing therefrom the torque direction signal and a motor command signal; and c. generator means connected to the command means to receive the motor command signal, and connected to the stationary member of the motor to supply excitation current thereto in response to the motor command signal.

2. Apparatus as recited in claim 1 wherein the phase shift means includes:

a. a velocity memory means receiving the velocity signal and the torque direction signal, and having stored therein the spatial relationship between the movable member and the resultant stationary member field due to the velocity of the movable member necessary to produce torque with a minimum excitation current at all speeds and producing a memory output signal; and b. a first adder means receiving the memory output signal and the position signal and adding the signals to establish the orientation command signal output of the phase shift means, which signal is dependent upon velocity and position of the movable member.

3. Apparatus as recited in claim 2 including:

a. torque memory means receiving the torque direction signal and a torque signal and producing a torque memory output signal; and b. a second adder means receiving the torque memory output signal and the orientation command signal from the first adder means and producing the orientation command signal output of the phase shift means, which signal is dependent upon position, velocity and torque of the movable member.

4. Apparatus as recited in claim 1 wherein the commutator means provides a motor command signal that has a maximum magnitude equal to the value of the torque error signal.

* * * * *